United States Patent
Zhang

(10) Patent No.: US 8,228,081 B2
(45) Date of Patent: Jul. 24, 2012

(54) TESTING APPARATUS

(75) Inventor: Bing-Jun Zhang, Shenzhen (CN)

(73) Assignees: Hong Fu Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 385 days.

(21) Appl. No.: 12/562,150

(22) Filed: Sep. 18, 2009

(65) Prior Publication Data

US 2010/0320999 A1     Dec. 23, 2010

(30) Foreign Application Priority Data

Jun. 23, 2009   (CN) .......................... 2009 1 0303546

(51) Int. Cl.
*G01R 31/26*   (2006.01)

(52) U.S. Cl. .................... 324/719; 324/522; 324/555

(58) Field of Classification Search .................. 324/522, 324/555
See application file for complete search history.

(56) References Cited

U.S. PATENT DOCUMENTS

2004/0145385 A1*  7/2004  Sen et al. ..................... 324/765
* cited by examiner

*Primary Examiner* — Huy Q Phan
*Assistant Examiner* — Temilade S Rhodes-Vivour
(74) *Attorney, Agent, or Firm* — Altis Law Group, Inc.

(57) ABSTRACT

A testing apparatus is provided to test whether a distance between a first and a second portions of an object is eligible. The testing apparatus includes a worktable, a positioning mechanism to support the object, a pressing mechanism to secure the object, and an actuating mechanism. The actuating mechanism outputs signals to reflect the relative position of the correspond to-be-tested portion and the actuating mechanism, therefore a controlling device indicates whether the distance between the to-be-tested portion and the base plane is eligible or not according the outputting signals of the corresponding actuating mechanism.

10 Claims, 8 Drawing Sheets

US 8,228,081 B2

TESTING APPARATUS

BACKGROUND

1. Technical Field

The present disclosure relates to testing apparatuses and, more particularly, to a testing apparatus to test whether distances between to-be-tested portions and a reference plane are eligible or not.

2. Description of the Related Art

Measuring distances between to-be-tested portions and a base plane is almost always necessary in manufacturing. Referring to FIGS. 1 and 2, a heat dissipating device for a central processing unit (CPU) includes a heat-conductive block 100 made of copper, a fin assembly 200 made of aluminum, and a supporting bracket 300. A flange 102 is formed at an end of the heat-conductive block 100. The supporting bracket 300 includes a flat mounting portion 301 and four bended fixing legs 302 extending from the mounting portion 301. A mounting hole 3011 is defined in a middle area of the mounting portion 301. A receiving passage 201 is defined in the fin assembly 200. In assembly, the heat-conductive block 100 is passed through the mounting hole 3011 of the mounting portion 301 of the supporting bracket 300 and the receiving passage 201 of the fin assembly 200, therefore, the mounting portion 301 is sandwiched between the flange 102 of the heat-conductive block 100 and a bottom of the fin assembly 200. To mount the heat dissipating device to the CPU on a main board, the heat-conductive block 100 abuts against a top surface of the CPU, and the fixing legs 302 abut against and are fixed to the main board. A distance H between each of the fixing legs 302 and the mounting portion 301 should be eligible to ensure the heat-conductive 100 tightly contact the CPU.

In a conventional distance testing, the mounting bracket 300 is disposed on a testing tool, and an operator manually presses the mounting bracket 300 onto a testing platform. The distances H between each of the fixing legs 302 of the bracket 300 and the mounting portion 301 are measured using gauges by the operator. Thus, the accuracy and reliability of the testing result is affected. Furthermore, the conventional testing is inefficient and laborious.

DETAILED DESCRIPTION

Figure 1:
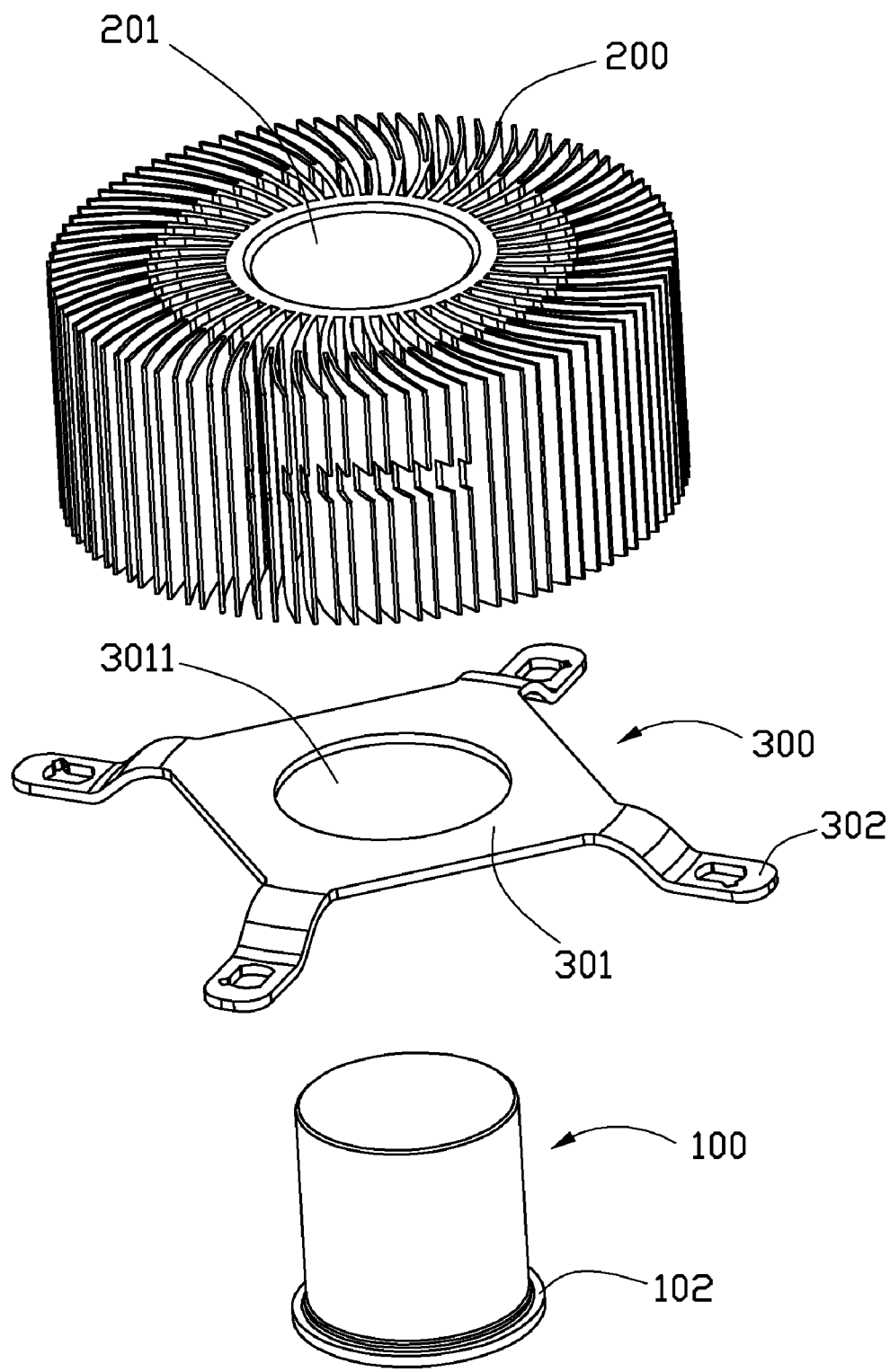
FIG. 1 is an exploded, isometric view of a heat dissipating device.
Figure 2:
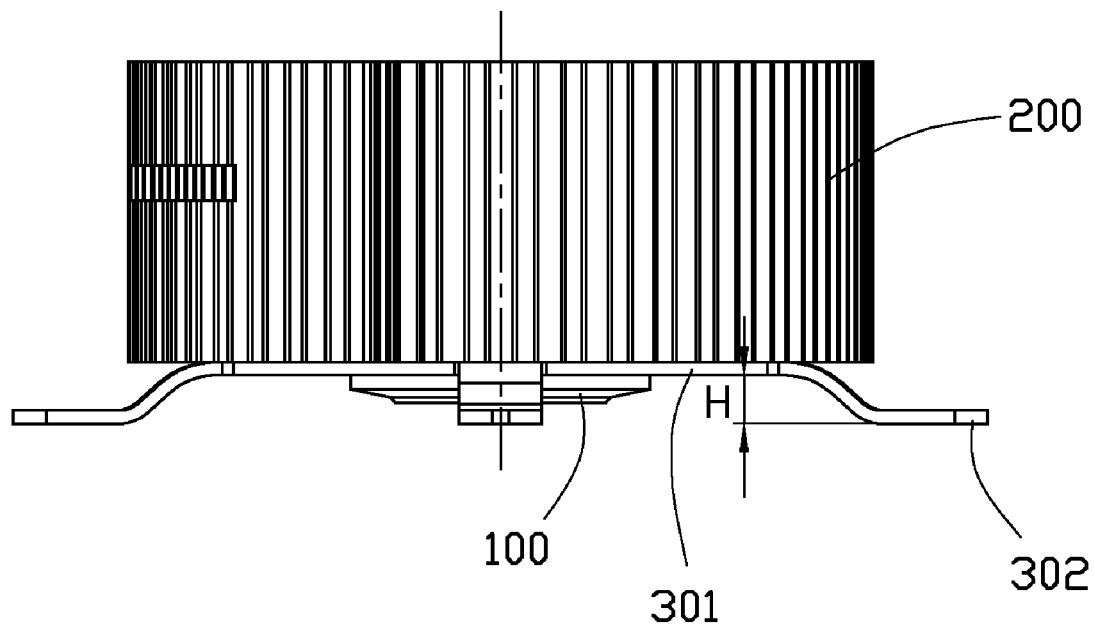
FIG. 2 a lateral view of an assembled heat dissipating device of FIG. 1.
Figure 3:
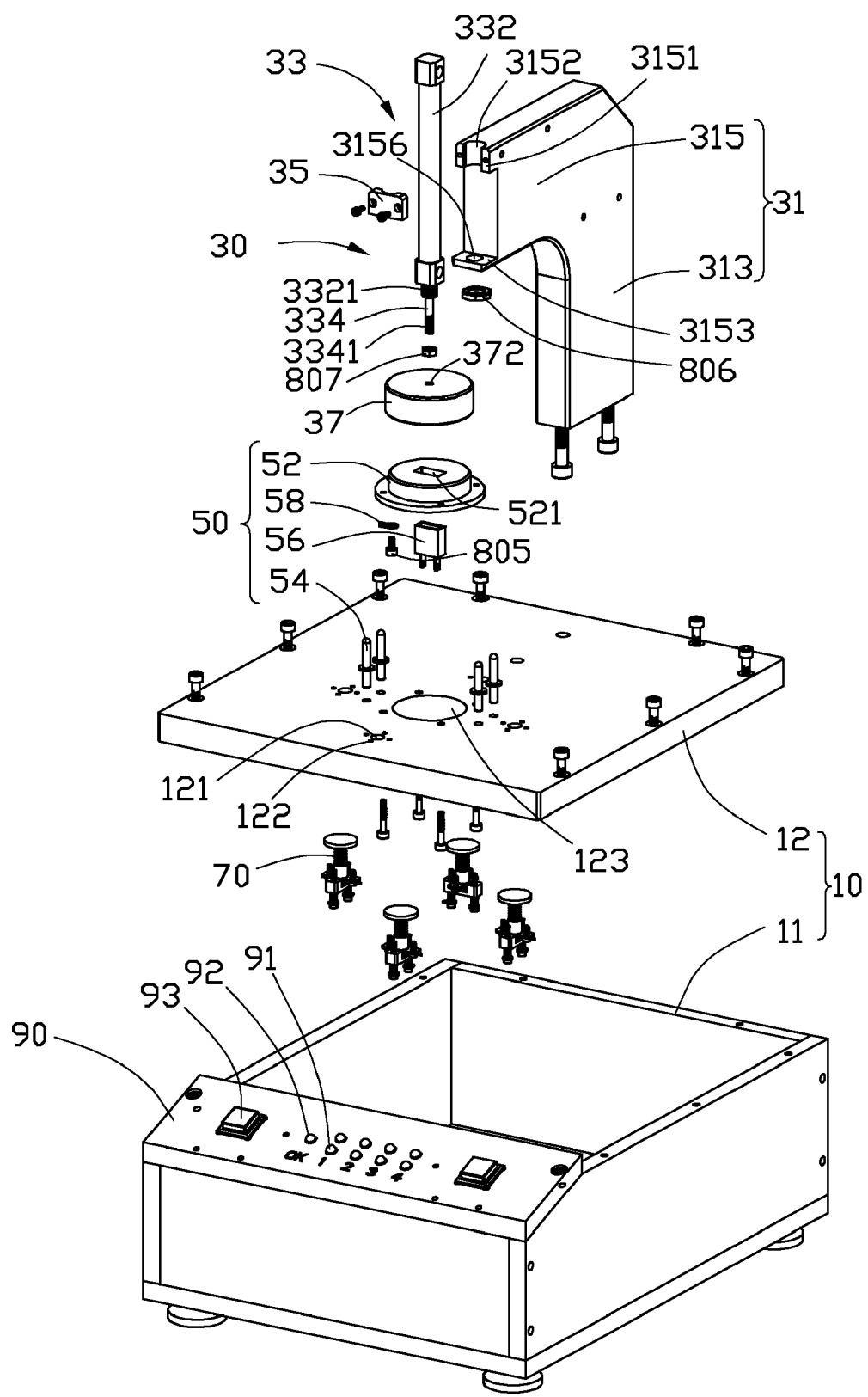
FIG. 3 is an exploded, isometric view of an exemplary embodiment of a testing apparatus, the testing apparatus includes four actuating mechanisms.

Referring to FIG. 3, in an exemplary embodiment, a testing apparatus is provided to test whether a distance between a to-be-tested portion and a reference plane is eligible. The testing apparatus includes a worktable 10, a pressing mechanism 30, a positioning mechanism 50, four actuating mechanisms 70, and an electrically controlling device 90.

Figure 5:
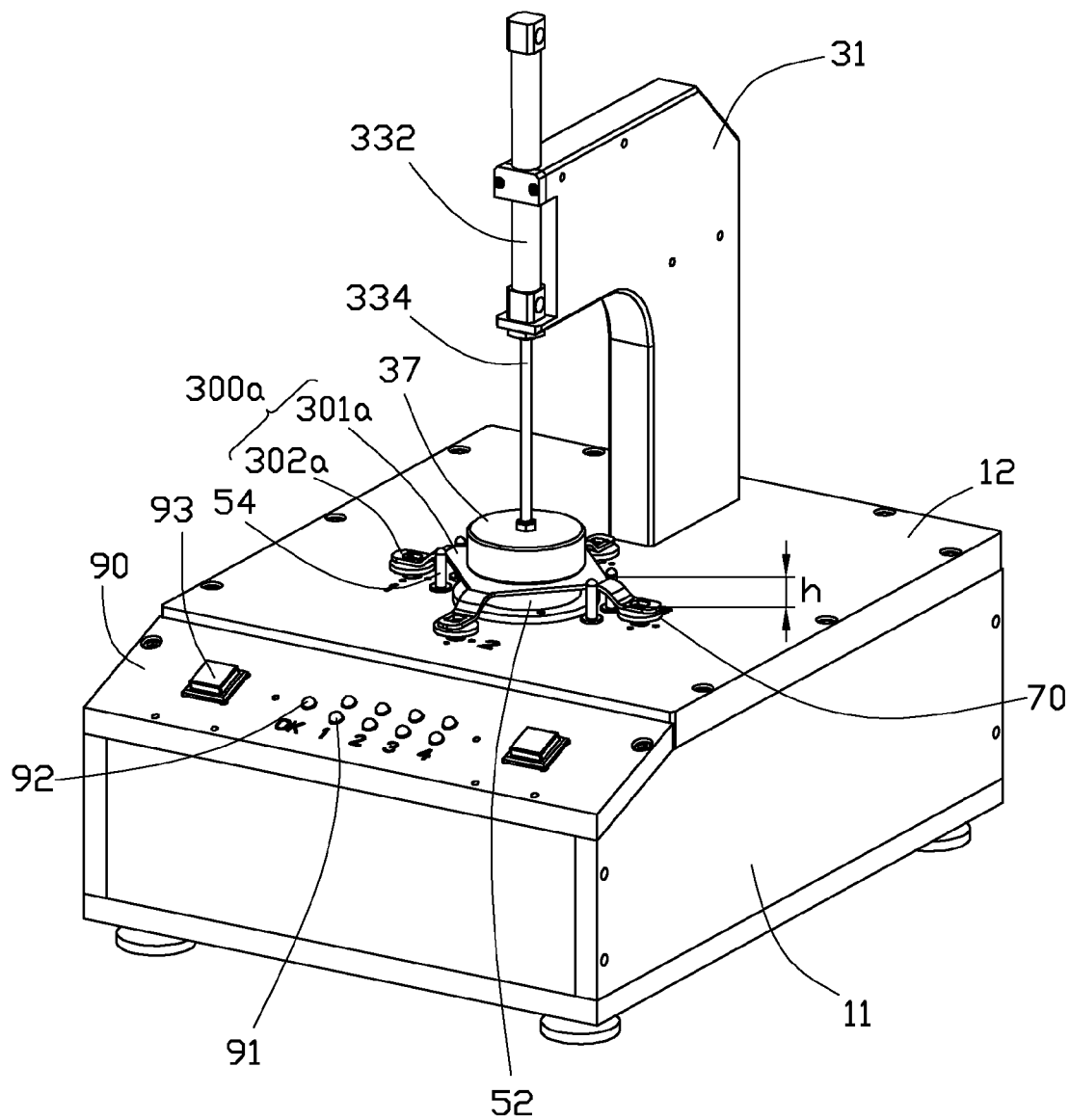
FIG. 5 is an assembled, isometric view of the testing apparatus of FIG. 3 and a supporting bracket, the supporting bracket includes a mounting portion and four fixing legs extending form the mounting portion.

Referring to FIG. 5, in one embodiment, there are four to-be-tested portions, for instance, four fixing legs 302a of a supporting bracket 300a of an heat dissipating device. The supporting bracket 300a is made of electrically conductive material. The reference plane is defined by a bottom surface of the mounting portion 301a of the supporting bracket 300a. A distance h is defined between each of the fixing legs 302a and the mounting portion 301a.

The worktable 10 includes a base 11, and a cover 12 made of insulated material. In one embodiment, the base 11 is a box with an opening defined on a top of the base 11 for receiving the cover 12. The cover 12 includes a through hole 123 defined in a middle of the cover 12, four positioning holes 121 around the through hole 123, and two pairs of screw holes 122 located on two perpendicularly crossed lines around each of the positioning holes 121.

The pressing mechanism 30 includes a fixing arm 31, a pneumatic cylinder 33, a securing member 35, and a pressing member 37. In one embodiment, the fixing arm 31 is L-shaped, and includes a supporting portion 313, and a connecting portion 315 perpendicular to the supporting portion 313. A coupler 3151 and a tab 3153 extend from a top edge and a bottom edge of a distal end of the connecting portion 315, respectively. The coupler 3151 defines a semi-circular slot 3152 therein. The tab 3153 defines a through hole 3156 therein. The semi-circular slot 3152 and the through hole 3156 are substantially in alignment with a vertical line. The pneumatic cylinder 33 includes a cylindrical body 332, and a plunger 334 retractably attached to the cylindrical body 332. A threaded portion 3321 is formed at an end of the cylinder body 332 adjacent to the plunger 334. A threaded portion 3341 is formed at a distal end of the plunger 334. The pressing member 37 is cylindrical and defines a screw hole 372 along a central axis of the pressing member 37. The securing member 35 defines a semi-circular slot in a side of the securing member 35, corresponding to the slot 3152 of the coupler 3151.

The positioning mechanism 50 includes an anvil 52 made of electrically conductive material, two pairs of position pins 54, a photoelectrical switch 56, and a terminal 58. The anvil 52 is shaped like a stepped column, and defines a rectangular through hole 521 along a central axis thereof.

Figure 4:
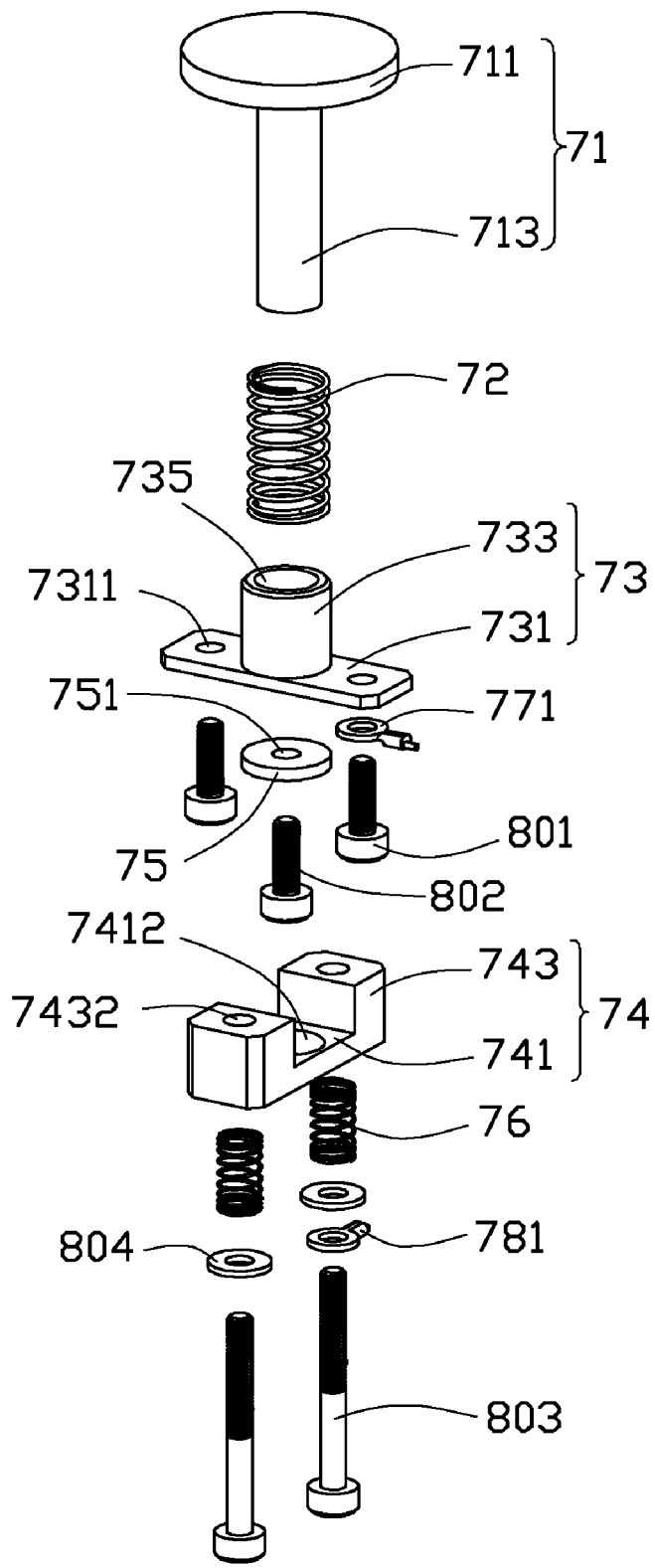
FIG. 4 is an exploded, isometric view of one of the actuating mechanisms of FIG. 3.

Referring to FIG. 4, the actuating mechanisms 70 are made of electrically conductive material. Each of the actuating mechanisms 70 includes a detecting pole 71, a first resilient member 72, a first abutting member 73, a second abutting member 74, a contacting member 75, two second resilient members 76, and two terminals 771, 781. The detecting pole 71 includes a disk-shaped head 711 and a shank 713 extending from the head 711. A screw hole (not shown) is defined in a distal end of the shank 713 opposite to the head 711. In one embodiment, the resilient member 72 and the second resilient members 76 are coil springs. The first abutting member 73 includes an abutting bar 731 and a cylindrical guiding sleeve 733 perpendicularly extending from a middle of the abutting bar 731. A guiding hole 735 is defined in the guiding sleeve 733 and extends through the abutting bar 731. Two fixing holes 7311 are respectively defined in opposite ends of the abutting bar 731. The second abutting member 74 is U-shaped, and includes a blocking portion 741 and two spaced fixing portions 743 extending from opposite ends of the block portion 741. An inference-avoiding hole 7412 is defined in the blocking portion 741 between the fixing portions 743. Each of the fixing portions 743 defines a fastening hole 7432 along a direction perpendicular to the block portion 741. The contacting member 75 defines a center hole 751 therein.

The electrically controlling device 90 is attached to an inside of the base 11, and includes a indicator 92, four pairs of indicators 91, and two buttons 93 exposed on an outside of the base 11. The indicator 92 is configured to indicate whether all the distances h between the four fixing legs 302a and the mounting portion 301a of supporting bracket 300a are eligible. Each pair of the indicators 91 is configured to indicate whether the distance between each of the four fixing legs 302a and the mounting portion 301a of supporting bracket 300a is eligible.

Figure 6:
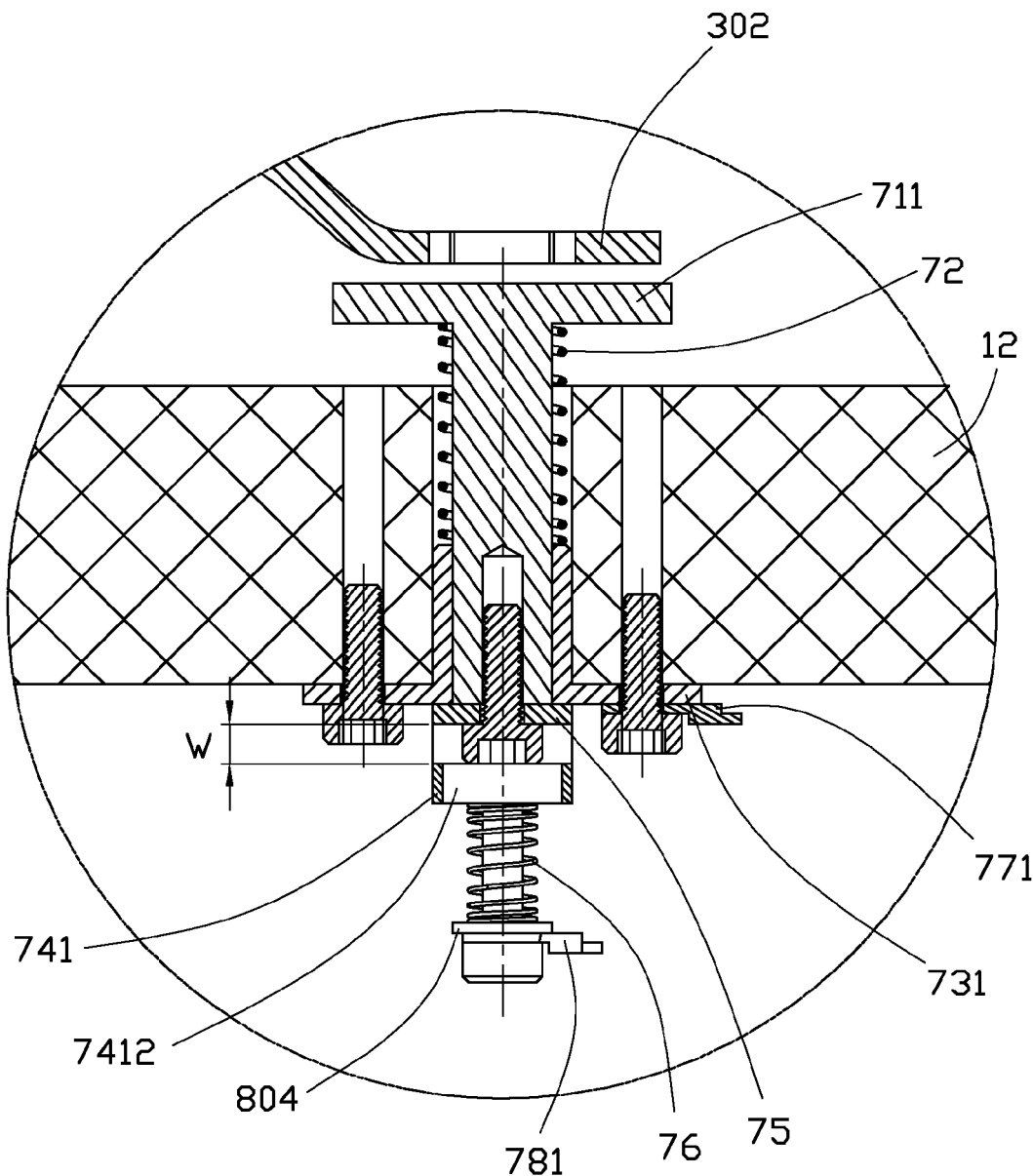
FIG. 6 is a partial, cross-sectional view of FIG. 5, showing the distance between one of the fixing legs and the mounting portion of the supporting bracket is less than a minimum eligible value.
Figure 7:
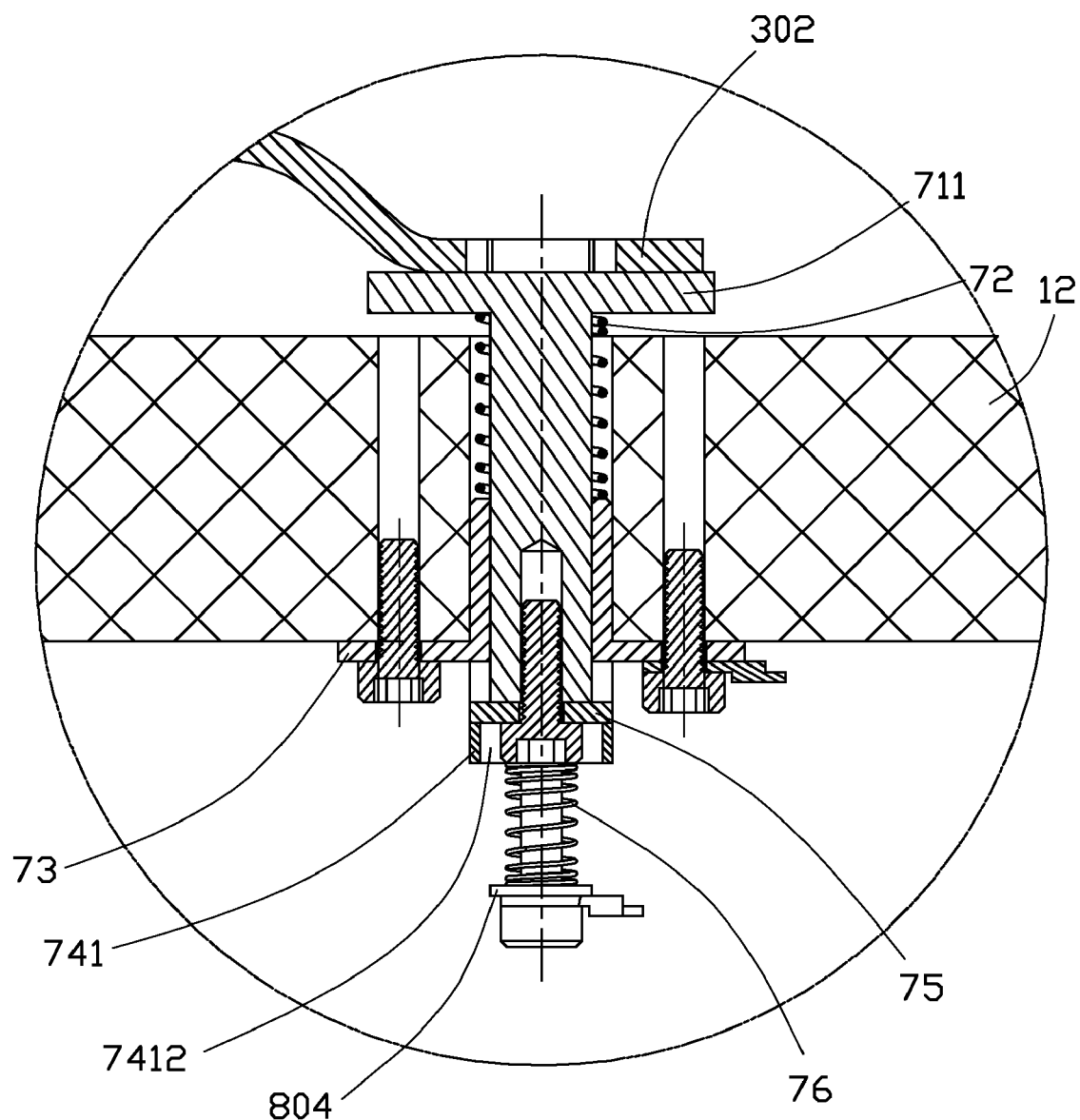
FIG. 7 is a partial, cross-sectional view of FIG. 5, showing the distance between one of the fixing legs and the mounting portion of the supporting bracket is larger than a maximum eligible value.
Figure 8:
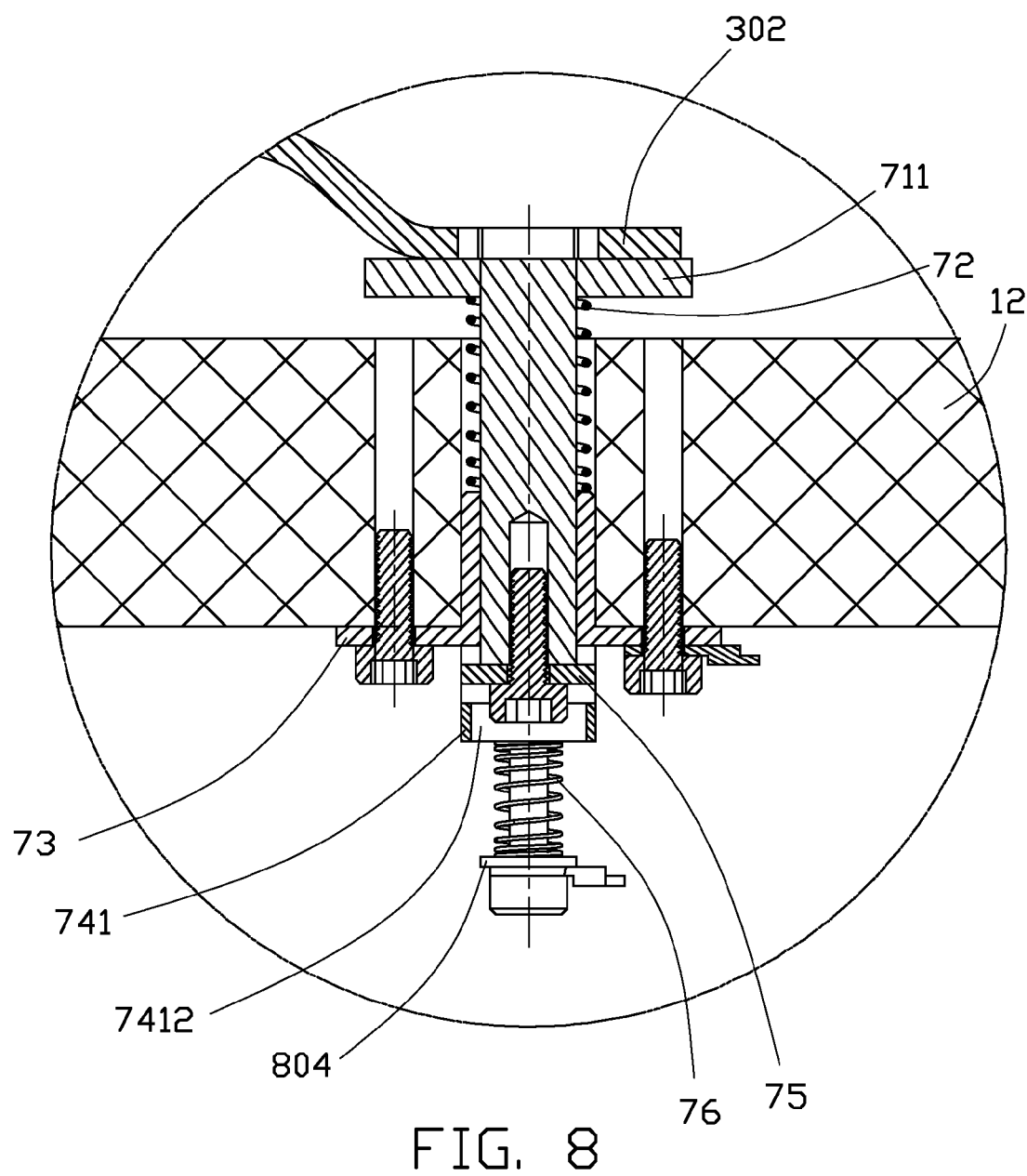
FIG. 8 is partial, cross-sectional view of FIG. 5, showing the distance between one of the fixing legs and the mounting portion of the supporting bracket is eligible.

Referring to FIGS. 3-6, to mount one of the actuating mechanisms 70 to the cover 12, the first abutting member 73 is secured to a bottom of the cover 12, with the guiding portion sleeve 733 of the first abutting member 73 extending through one of the positioning holes 121, and two screws 801 respectively extending through the fixing holes 7311 of the abutting bar 731 to engage in a first pair of the screw holes 122 around the corresponding positioning hole 121 of the cover 12. The terminal 771 is fixed around the shank of one of the screws 801 and sandwiched between the head of the corresponding screw 801 and the lower portion of the abutting bar 731. The shank 713 of the detecting pole 71 is passed through the first resilient member 72, the corresponding positioning hole 121 of the cover 12, and the guiding hole 735 of the guiding sleeve 733 of the first abutting member 73. Opposite ends of the first resilient member 72 resist against the abutting bar 731 and the head 711 of the detecting pole 71. The contacting member 75 is secured around the shank 713 and a screw 802 is extended through the center hole 751 to engage in the screw hole of the shank 713. The head 711 of the detecting pole 71 is urged upward by the first resilient member 72, therefore, the contacting member 75 is capable of moving with the detecting pole 71 to abut against the abutting bar 731 of the first abutting member 73. The second abutting member 74 is secured to the bottom of the cover 12, with two bolts 803. Each of the bolts 803 is passed respectively extending through two washers 804, the second resilient members 76, the fastening holes 7432 of the second abutting member 74 to engage in a second pair of the screw holes 122 around the corresponding positioning hole 121 of the cover 12. The terminal 781 is fixed around the shank of one of the bolts 803 and sandwiched between the head of the corresponding bolt 803 and the corresponding washer 804. In assembly, the second abutting member 74 is spaced from and bestrides across the first abutting member 73. According to the similar process described above, the other three actuating mechanisms 70 are mounted to the cover 12, corresponding to the positioning holes 121 of the cover 12. Referring to FIGS. 6-8, a sliding range of the contacting member 75 between the abutting bar 731 of the first abutting member 73 and the blocking portion 741 of the second abutting member 74 is defined as w. The sliding range w is equal to a difference between a maximum and a minimum eligible value of the distance h.

Referring also to FIG. 5, to mount the positioning mechanism 50 to the cover 12, the photoelectrical switch 56 is retained in the through hole 521 of the anvil 52. The terminal 58 is fixed to a bottom of the anvil 52 with a screw 805. The anvil 52 is secured to the top of the cover 12 and the photoelectrical switch 56 is aligned with the through hole 123 of the cover 12. The two pairs of the position pins 54 are secured to the cover 12 adjacent to the anvil 52. The fixing arm 31 is perpendicularly connected to the cover 12. The cylinder body 332 of the pneumatic cylinder 33 is engaged in the slot 3152 of the coupler 3151 of the fixing arm 31. The threaded portion 3321 of the cylinder body 332 and the plunger 334 of the pneumatic cylinder 33 are passed through the through hole 3156 of the tab 3153 of the fixing arm 31. The securing member 35 is attached to the coupler 3151, with a pair of conventional fasteners extending through the securing member 35 to engage in the coupler 3151. The semi-circular slot of the securing member and the semi-circular slot 3152 of the coupler 3151 cooperatively define a space to receive the cylindrical body 332. A nut 806 is engaged with the threaded portion 3321. Thus, the pneumatic cylinder 33 is fixed to the fixing arm 31, aligned with the photoelectrical switch 56. The threaded portion 3341 of the plunger 334 engages in a nut 807 and the screw hole 372 of the pressing member 37 to attach the pressing member 37 to the plunger 334. The nut 807 is manipulated to lock the pressing member 37 to the plunger 334. The terminals 58, 771, 781 and the photoelectrical switch 56 are respectively connected to the controlling device 90 leads (not shown), therefore, the anvil 52, the first abutting member 73, the second abutting member 74, and the photoelectrical switch 56 are electrically coupled to the electrically controlling device 90. The cover 12 is attached to the base 10, thereby shielding the opening of the base 11. Distances between a top surface of the anvil 52 and the top surfaces of the heads 711 of the detecting poles 71 are equal to the distance h.

In testing, the mounting portion 301a of the supporting bracket 300a is disposed on the top surface of the anvil 52 and the fixing legs 302a of the supporting bracket 300a are aligned with the top surfaces of the detecting poles 71 of the actuating mechanisms 70. Two opposite fixing legs 302a of the supporting bracket 300a are positioned by the two pairs of the positioning pins 54, therefore, a rotation of the supporting bracket 300a is prevented. The buttons 93 are operated to drive the plunger 334 of the pneumatic cylinder 33 to extend downward until the pressing member 37 abuts against the mounting portion 301a to make the bottom surface of the mounting portion 301a to be coplanar with the top surface of the anvil 52. At the same time, the photoelectrical switch 56 is shield to start the controlling device 90. The anvil 52 is supplied a low voltage level, the first abutting member 73 and the second abutting member 74 are supplied high voltage levels, respectively. Since the supporting bracket 300a contacts with the anvil 52, the supporting bracket 300a is also at a low voltage level. The distance "h" of each of the fixing legs 302a of the supporting bracket 300a and the mounting portion 301a can be indicated by the controlling device 90 as below detailed description.

Referring to FIG. 6, when the distance h of one of the fixing legs 302a of the supporting bracket 300a is less than a minimum eligible value, the fixing leg 302a keep spaced from the head 711 of the detecting pole 71 of the corresponding actuating mechanism 70. Thus, the first abutting member 73 and the second abutting member 74 both remain at the high voltage levels. One of the corresponding pair of the indicating lights 91 may be lighted up to show the current distance h is ineligible, and less than the minimum eligible value.

Referring to FIG. 7, when the distance h of one of the fixing legs 302a of the supporting bracket 300a is larger than the maximum eligible value, the fixing leg 302a abuts against the head 711 of the detecting pole 71 of the corresponding actuating mechanism 70 to urge the detecting pole 71 to move toward the second abutting member 74. The contacting member 75 moves with the detecting pole 71 to abut against the second abutting member 74. The first abutting member 73, the supporting bracket 300a, and the second abutting member 75 are electrically connected. Therefore, the first abutting member 73 and the second abutting member 74 turn to low voltage levels. The other one of the corresponding pair of the indicating lights 91 may be lighted up to show the current distance h of the fixing leg 302a is ineligible, and larger than the maximum eligible value. The second resilient members 76 can be compressed to prevent the second abutting member 74 from being destroyed by excessive striking of the detecting poles 71.

Referring to FIG. 8, when the distance h of one of the fixing legs 302a of the supporting bracket 300a is between the maximum value and the minimum eligible value, the fixing leg 302a abuts against the head 711 of the detecting pole 71 of the corresponding actuating mechanism 70 to urge the detecting pole 71 to move toward the second abutting member 74, without contacting the second abutting member 74. The first abutting member 73 is electrically connected to the supporting bracket 300a through the detecting pole 71. Therefore, the first abutting member 73 turns to low voltage level and the second abutting member 74 still remains at the high voltage level. Neither of the corresponding pair of the indicating lights 91 may be lighted up to show the current distance h is eligible.

When the first abutting members 73 of the four actuating mechanisms 70 are at low voltage levels and the second abutting members 74 are at high voltage levels, the four pairs of indicators 93 are not be lighted up and the indicator 92 is lighted up to show the distances h of the four fixing legs 302s of the support bracket 300a are eligible.

It is believed that the present embodiment and its advantages will be understood from the foregoing description, and it will be apparent that various changes may be made thereto without departing from the spirit and scope of the description or sacrificing all of its material advantages, the example hereinbefore described merely being exemplary embodiment.

What is claimed is:

1. A testing apparatus to test whether a distance between a first and a second portions of an electrically conductive object is eligible, the testing apparatus comprising:
a worktable;
a positioning mechanism secured to the worktable, comprising an anvil abutting against the first portion of the object;
a pressing mechanism pressing the object against the anvil;
an actuating mechanism comprising a detecting pole slidably mounted to the worktable and aligned with the second portion, a first abutting member mounted to the worktable and electrically connected to the detecting pole, a second abutting member mounted to the worktable and spaced from the first abutting member, and a contacting member secured to the detecting pole and slidable with the detecting pole between the first abutting member and the second abutting member; and
an controlling device electrically coupled to the first abutting member, the second abutting member, and the anvil, wherein signals at the first abutting member and the second abutting member change according to the distance between the first and second portions of the object, the controlling device accordingly indicates whether the distance is eligible;
wherein the detecting pole comprises a head facing the second portion, and a shank extending from the head away from the second portion, the contacting member is secured to an end of the shank opposite to the head.

2. The testing apparatus of claim 1, wherein the shank extends through the first abutting member.

3. The testing apparatus of claim 2, wherein the second abutting member is U-shaped, and comprises a blocking portion and two fixing portions substantially perpendicularly extending from opposite ends of the blocking portion, the second abutting member bestrides across the first abutting member.

4. The testing apparatus of claim 1, wherein the actuating mechanism further comprises a resilient member to urge the detecting pole to move towards the second portion.

5. The testing apparatus of claim 4, wherein the resilient member is a coil spring placed around the shank of the detecting pole and comprises opposite ends resisting against the head of the detecting pole and the first abutting member, respectively.

6. The testing apparatus of claim 1, wherein the first abutting member and second abutting member are provided with high voltage levels, the anvil is provided with a low voltage level, the first abutting member and the second abutting member both keep at high voltage levels when the distance between the first portion and the second portion is less than a minimum eligible value; first abutting member and the second abutting member both turn to low voltage levels when the distance between the first portion and the second is larger than a maximum eligible value; the first abutting member turns to low voltage level and the second abutting member keeps high voltage level when the distance between the first portion and the second portion is eligible.

7. The testing apparatus of claim 1, wherein the actuating mechanism further comprises at least one resilient member resisting against a side of the second abutting member opposite to the detecting pole.

8. The testing apparatus of claim 1, wherein the controlling device comprises a plurality of indicators to indicate whether the distance between the first and second portions is eligible.

9. The testing apparatus of claim 3, wherein a sliding range of the contacting member between the abutting bar of the first abutting member and the blocking portion of the second abutting member is equal to a difference between a maximum and minimum eligible values of the distance between the first portion and the second portion of object and the base plane.

10. A testing apparatus to test whether a distance between a first and a second portions of an electrically conductive object is eligible, the testing apparatus comprising:
a worktable;
a positioning mechanism secured to the worktable, comprising an anvil abutting against the first portion of the object;
a pressing mechanism pressing the object against the anvil;
an actuating mechanism comprising a detecting pole slidably mounted to the worktable and aligned with the second portion, a first abutting member mounted to the worktable and electrically connected to the detecting pole, a second abutting member mounted to the worktable and spaced from the first abutting member, and a contacting member secured to the detecting pole and slidable with the detecting pole between the first abutting member and the second abutting member; and an controlling device electrically coupled to the first abutting member, the second abutting member, and the anvil, wherein signals at the first abutting member and the second abutting member change according to the distance between the first and second portions of the object, the controlling device accordingly indicates whether the distance is eligible;

wherein the first abutting member and second abutting member are provided with high voltage levels, the anvil is provided with a low voltage level, the first abutting member and the second abutting member both keep at high voltage levels when the distance between the first portion and the second portion is less than a minimum eligible value; first abutting member and the second abutting member both turn to low voltage levels when the distance between the first portion and the second is larger than a maximum eligible value; the first abutting member turns to low voltage level and the second abutting member keeps high voltage level when the distance between the first portion and the second portion is eligible.

* * * * *

UNITED STATES PATENT AND TRADEMARK OFFICE
CERTIFICATE OF CORRECTION

PATENT NO. : 8,228,081 B2
APPLICATION NO. : 12/562150
DATED : July 24, 2012
INVENTOR(S) : Bing-Jun Zhang It is certified that error appears in the above-identified patent and that said Letters Patent is hereby corrected as shown below:

Please replace Item (73) regarding "Assignees" on the Title page of the Patent with the following:

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

Signed and Sealed this
Eleventh Day of March, 2014

Michelle K. Lee
*Deputy Director of the United States Patent and Trademark Office*